April 13, 1954     F. P. BENNETT     2,674,920
STEREOSCOPIC VIEWER
Filed July 17, 1952     2 Sheets-Sheet 1
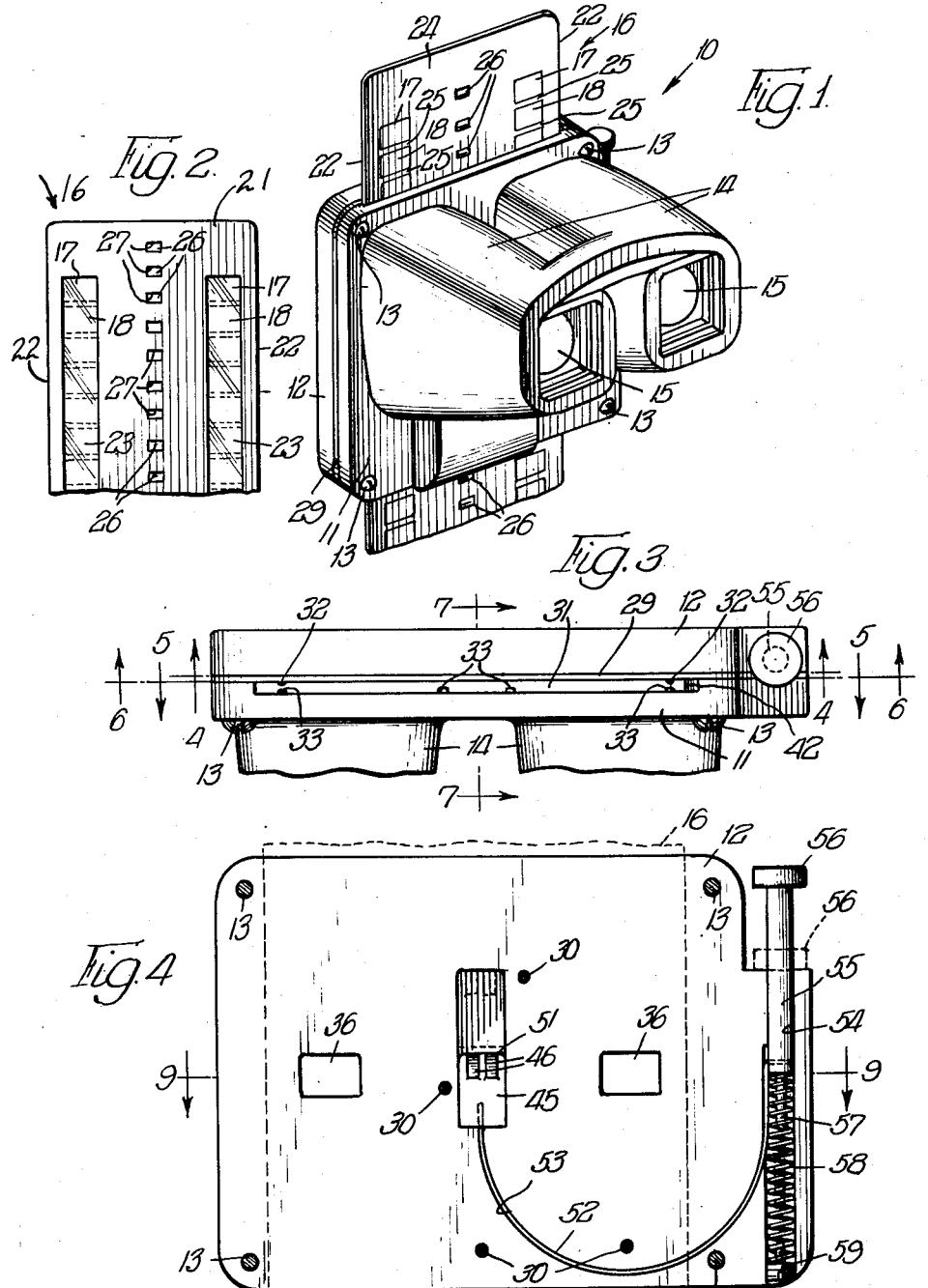
INVENTOR.
Frank P. Bennett,
BY
Robert R. Lockwood
Atty April 13, 1954     F. P. BENNETT     2,674,920
STEREOSCOPIC VIEWER
Filed July 17, 1952     2 Sheets-Sheet 2
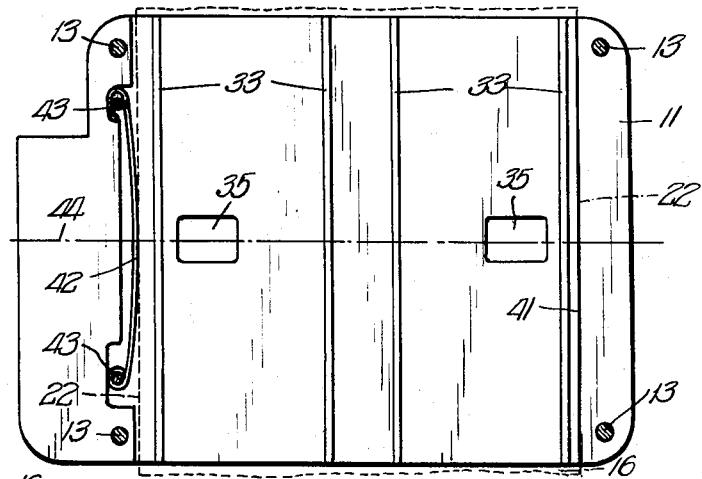
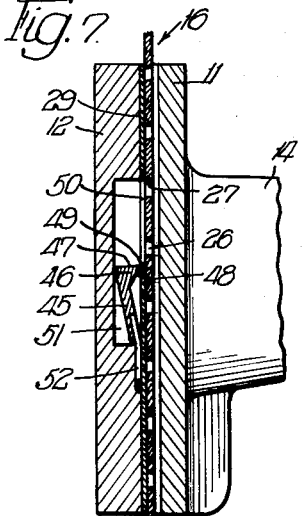
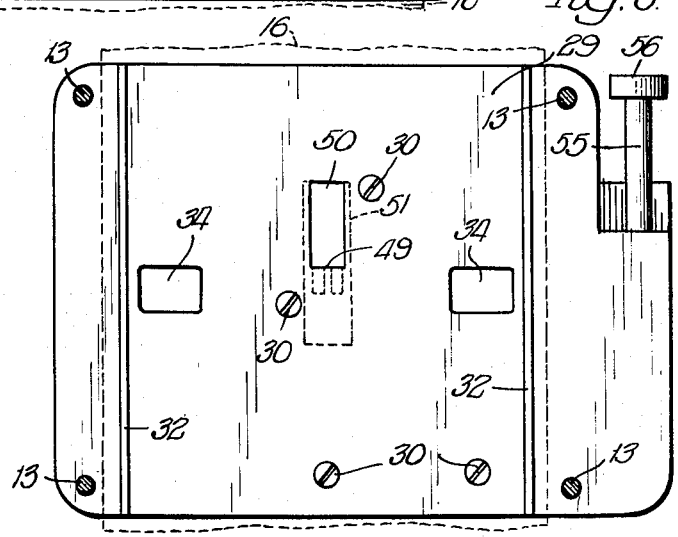
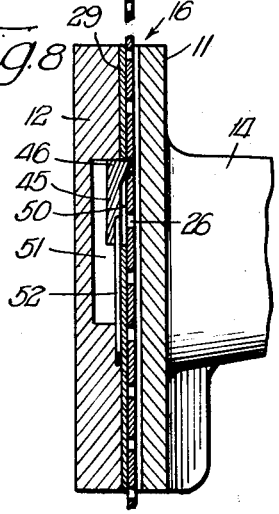
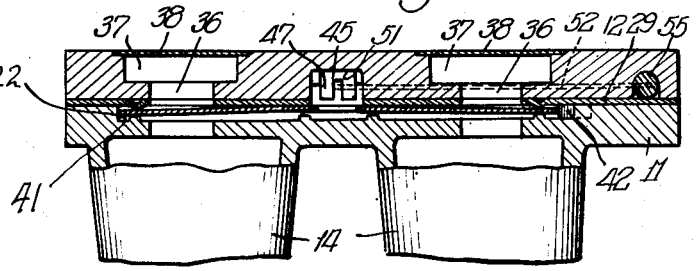
INVENTOR.
Frank P. Bennett,
BY
Robert R. Lockwood
Atty.

Patented Apr. 13, 1954

2,674,920

UNITED STATES PATENT OFFICE 2,674,920

STEREOSCOPIC VIEWER

Frank P. Bennett, Chicago, Ill., assignor to Three Dimension Company, Chicago, Ill., a corporation of Illinois Application July 17, 1952, Serial No. 299,430

7 Claims. (Cl. 88—31)

This invention relates, generally, to viewing devices, and it has particular relation to stereoscopic viewing devices.

Among the objects of this invention are: To provide simple, efficient, and economical means for stereoscopically viewing stereoscopic pairs of views, such as transparencies; to provide for simply and economically mounting stereoscopic pairs of transparencies on a rectangular card and for moving the card through a stereoscopic viewer; to guide the card through the viewer in such manner that the stereoscopic pairs of transparencies are accurately aligned with the axes of the viewing tubes; to move the card through the viewer by the interaction of a tooth carried by a finger having both longitudinal and transverse movement and shoulders on the card provided by apertures therein; to move the tooth out of the path of the card to permit the same to move in the card chamber of the viewer without interference thereby; and to transmit motion to the tooth from a manually moved spring retracted plunger by a wire interconnecting the finger and the plunger.

Other objects of this invention will, in part, be obvious and in part appear hereinafter.

This invention is disclosed in the embodiment thereof shown in the accompanying drawings and it comprises the features of construction, combination of elements, and arrangement of parts which will be exemplified in the construction hereinafter set forth and the scope of the application of which will be indicated in the appended claims.

For a more complete understanding of the nature and scope of this invention, reference can be had to the following detailed description, taken together with the accompanying drawings, in which:

Figure 1 is a perspective view of a stereoscopic viewer and card carrying stereoscopic pairs of transparencies all constructed in accordance with this invention;

Figure 2 is a view of the card shown in Figure 1 from the opposite side;

Figure 3 is a top plan view of the viewer shown in Figure 3, portions of the viewing tubes being broken away in order to conserve space;

Figures 4, 5, and 6 are sectional views taken generally along the lines 4—4, 5—5 and 6—6 of Figure 3;

Figure 7 is a vertical sectional view taken generally along the lines 7—7 of Figure 3;

Figure 8 is a view, similar to Figure 7, and showing how the tooth carried by the finger cooperates with a shoulder on the card for moving the same upwardly; and Figure 9 is a horizontal sectional view taken generally along the line 9—9 of Figure 4.

Referring now particularly to Figure 1 of the drawings, it will be observed that the reference character 10 designates, generally, a stereoscopic viewer in which the present invention is incorporated. The viewer 10 includes a front housing 11 and a rear housing 12, preferably formed of suitable plastic material. The housings 11 and 12 may be secured together in any suitable means, such as by screws 13 at the corners thereof. Extending forwardly from the front housing 11 and preferably formed integrally therewith are viewing tubes 14 which carry binocular viewing lenses 15.

The images to be viewed are carried by a rectangular card that is indicated, generally, at 16. The guide 16 carries stereoscopic pairs of transparencies 17—17, 18—18, etc., the number of pairs being limited only by the desired length of the card 16. It will be understood that the stereoscopic pairs of transparencies 17—17, 18—18, etc. are spaced apart horizontally on the card 16 so as to align with the lenses 15 carried by the viewing tubes 14 and that this spacing is the average spacing of the eyes of the person using the viewer.

The rectangular card 16 is of laminated construction. As shown in Figure 2 it comprises a paperboard backing 21 which also could be made of suitable metal foil. The paperboard backing 21 has parallel edges 22 and spaced inwardly therefrom and parallel thereto are elongated openings 23 for receiving the stereoscopic pairs of transparencies 17—17, 18—18, etc. It will be understood that the transparencies for each of the elongated openings 23 can be provided as individual transparencies or that they can be formed as film strip. Overlying the paperboard backing 21 and the transparencies is a film 24 which may be exposed so as to provide the required transparent areas through which the transparencies can be viewed. The film 24 is developed in such manner as to provide picture dividers 25 between the individual transparencies so that they may be suitably segregated the one from the other.

The rectangular card 16 is arranged to be moved through the viewer 10 in a manner to be described in detail hereinafter. In order to permit this movement the card 16 is provided with a row of apertures 26, each aperture being individual to a pair of transparencies and the row of apertures being midway between the parallel edges 22 of the card 16 and parallel thereto. The upper edges of the apertures 26 provide shoulders 27, Figure 2, against which transport means reacts for the purpose of moving the card 16 upwardly through the viewer 10 for showing the pairs of transparencies pair by pair.

Interposed between the front and rear housings 11 and 12 is a barrier plate 29, Figures 3 and 6. It is held in position on the rear housing 12 by screws 30. The front side of the barrier plate 29 and the rear side of the front housing 11 provide a generally rectangular card chamber 31 for receiving the card 16. Lands 32 extending forwardly from the barrier plate 29 and lands 33 extending rearwardly from the rear side of the front housing 11 bear against the card 16 and serve to accurately position it in the proper position with respect to the lenses 15 while permitting movement of the card vertically in this plane.

It will be noted that the barrier plate 29, which may be formed of metal, is provided with light transmitting apertures 34 which have the same horizontal spacing as the lenses 15 and the transparencies 17—17, etc. Registering with the apertures 34 in the barrier plate 29 are apertures 35 in the front housing 11 and apertures 36 in the rear housing 12. As shown in Figure 9 the apertures 36 open into larger apertures 37 which are covered by light diffusing sheets 38.

As shown more clearly in Figure 5 the rear side of the front housing 11 is provided with a vertical guide 41 along which one of the parallel edges 22 of the card 16 is slidable. The opposite side of the front housing 11 is provided with a bow spring 42, the ends of which are curved around transversely extending pins 43 which serve to hold the spring 42 in position and yet permit the same to move relatively thereto. The bowspring 42 is arranged to transmit its force against the adjacent edge 22 of the card 16 which is shown by broken lines along a line 44 which extends through the light transmitting apertures 35 and thus extends through the pair of transparencies registering therewith. This arrangement of the bow spring 42 reacting against the parallel side 22 of the card 16 with the other parallel side 22 held tightly against the vertical guide 41 serves to position the pair of transparencies being viewed accurately in the viewing field.

It has been pointed out that the card 16 is provided with apertures 26 and shoulders 27 to facilitate movement of the card 16 through the viewer 10. The mechanism for accomplishing such movement now will be described. As shown in Figure 4 the rear housing 12 carries a finger 45 which is generally rectangular in shape and has at its upper end a bifurcated tooth 46. As shown more clearly in Figure 7 the tooth 46 has an upper flat end 47 which is arranged to bear against the shoulder 27 of the aperture 26 registering therewith. The underside 48 of the tooth 46 is beveled and cooperates with a lower edge 49 of a vertically extending rectangular opening 50 in the barrier plate 29 for retracting the tooth 46 from the opening 50 into a finger groove 51 in which the finger 45 slides up and down. Connected to the lower end of the finger 45 is a resilient wire 52 which lies in and is movable in a groove 53 which extends semi-circularly from the bottom of the finger groove 51 to a plunger groove 54. The wire 52 is held in the groove 53 by the barrier plate 29. Thus the wire 52 cannot escape from its groove 53 regardless whether tension or compression stress is transmitted thereto. The other end of the wire 52 is secured to the lower end of a plunger 55 which is slidable in the plunger groove 54. At its upper end the plunger 55 has a head 56 which can be engaged by the forefinger of the person using the viewer 10, for operating it. At its lower end the plunger 55 has a pin 57 which centers the upper end of a coil compression spring 58 against the bottom of the plunger 55. The lower end of the coil compression spring 58 bears against a hollow set screw 59 which is threaded into the lower end of the plunger 54.

In describing the operation of the viewer 10, it will be assumed that the finger 45 and tooth 46 are in the retracted position shown in Figures 4 and 7 of the drawings. Also it will be assumed that the card 16 has been positioned in the card chamber 31 so that one of the apertures 26 can be engaged by the tooth 46. Now the plunger 55 is depressed against the spring 58 and the latter is compressed. The downward movement of the plunger 55 causes the application of compressive stress to the wire 52. As a result the finger 45 is moved upwardly from its position as shown in Figure 7 to the position as shown in Figure 8. Because of the resiliency of the wire 52, the finger 45 is biased outwardly. However, when it is in the position shown in Figure 7, it is prevented from moving outwardly by the overlying portion of the barrier plate 29. As the finger 45 is moved upwardly, the tooth 46 moves into the lower end of the opening 50 in the barrier plate 29 and into the aperture 26 registering therewith. The upper flat end 47 of the tooth 46 then engages the shoulder 27 of the aperture 26 and thereby moves the card 16 upwardly so as to position the next pair of transparencies in the viewing field. On relief of pressure from the head 56 of the plunger 55, the spring 58 expands and returns the plunger 55 to the position shown in Figure 4. Such movement of the plunger 55 applies tension stress to the wire 52 and causes the finger 45 to be moved from the position shown in Figure 8 back to the position shown in Figure 7 where the tooth 46 is fully retracted from the card chamber 31. Thus, in the retracted position, the tooth 46 cannot interfere in any way with the movement of the card 16 through the card chamber 31.

Since certain changes can be made in the foregoing construction and different embodiments of the invention can be made without departing from the spirit and scope thereof, it is intended that all matters shown in the accompanying drawings and described hereinbefore shall be interpretated as illustrative and not in a limiting sense.

What is claimed as new is:

1. A viewer for stereoscopic pairs of views carried along the parallel edges of a card having a row of apertures parallel to said edges and between said pairs of views comprising, in combination, housing means having a vertically extending chamber for receiving said card, viewing means carried by said housing through which said pairs of views can be observed pair by pair; guide means in said chamber including a vertical edge guide to be engaged by one parallel edge of said card and a spring to engage the other parallel edge of said card to guide the same vertically, said spring being a bow spring and positioned to react against said card along a line through the pair of views being observed, and spaced lands on opposite sides of said card to hold in coplanar relation the pairs of views being observed; a tooth vertically slidably mounted in said housing between the sides thereof for entering said card chamber and one of said apertures for advancing said card so that said pairs of views can be successively observed, guide means for said tooth to direct the movement thereof into and out of said apertures and for moving said card, a manually operated member carried by said housing, a wire interconnecting said tooth and said member to transmit motion of the latter to the former, and confining means in said housing for said wire whereby the same can transmit both tension and compression stress, said confining means being provided by the sides of a groove embracing said wire for the major portion of its length.

2. A stereoscopic viewer comprising, in combination, a front housing, a pair of horizontally disposed viewing tubes extending forwardly from said housing, a barrier plate overlying the rear side of said front housing and defining therewith a card chamber for receiving said card and having a pair of light transmitting apertures aligned with said viewing tubes, means in said card chamber for guiding said card therethrough and holding it in viewing position, said barrier plate having a vertically extending opening midway the sides of said card chamber, a rear housing overlying said barrier plate and secured thereto and to said front housing and having a pair of light transmitting apertures aligned with said apertures in said barrier plate and a vertical rectangular finger groove aligned with and extending below said vertical opening in said barrier plate, a finger slidable in and guided by said finger groove, a tooth carried by the upper end of said finger for engaging by its upper side a shoulder on said card to move the same through said card chamber, the underside of said tooth being beveled to cooperate with the lower edge of said vertical opening in said barrier plate to move said tooth rearwardly out of said vertical opening, manually operable means carried by said rear housing and connected to said finger to move the same vertically, movement of said manually operable means in one direction being accompanied by upward movement of said finger and subsequent forward movement of said tooth to engage a shoulder on said card and move the same upwardly, upward movement of said manually operable means in the opposite direction being accompanied by downward movement of said finger and subsequent withdrawal of said tooth from said shoulder and from said vertical opening in said barrier plate.

3. A stereoscopic viewer comprising, in combination, a front housing, a pair of horizontally disposed viewing tubes extending forwardly from said housing, a vertical guide along one edge of said front housing on the rear side thereof, a bow spring along the opposite edge on the rear side of said front housing for biasing one parallel edge of a stereoscopic transparency bearing card to hold the other parallel edge against said vertical guide, said bow spring reacting along a line through the pair of transparencies aligned with said viewing tubes, a barrier plate overlying said rear side of said front housing and defining therewith a card chamber for receiving said card and having a pair of light transmitting apertures aligned with said viewing tubes, said rear side of said front housing and the front side of said barrier plate having lands for guiding said card through said card chamber, said barrier plate having a vertically extending opening midway the sides of said card chamber, a rear housing overlying said barrier plate and secured thereto and to said front housing and having a pair of light transmitting apertures aligned with said apertures in said barrier plate and a vertical rectangular finger groove aligned with and extending below said vertical opening in said barrier plate, a finger slidable in and guided by said finger groove, a tooth carried by the upper end of said finger for engaging by its upper side a shoulder on said card to move the same through said card chamber, the underside of said tooth being beveled to cooperate with the lower edge of said vertical opening in said barrier plate to move said tooth rearwardly out of said vertical opening, manually operable means carried by said rear housing and connected to said finger to move the same vertically, movement of said manually operable means in one direction being accompanied by upward movement of said finger and subsequent forward movement of said tooth to engage a shoulder on said card and move the same upwardly, movement of said manually operable means in the opposite direction being accompanied by downward movement of said finger and subsequent withdrawal of said tooth from said shoulder and from said vertical opening in said barrier plate.

4. A stereoscopic viewer comprising, in combination, a front housing, a pair of horizontally disposed viewing tubes extending forwardly from said housing, a vertical guide along one edge of said front housing on the rear side thereof, a bow spring along the opposite edge on the rear side of said front housing for biasing one parallel edge of a stereoscopic transparency bearing card to hold the other parallel edge against said vertical guide, said bow spring reacting along a line through the pair of transparencies aligned with said viewing tubes, a barrier plate overlying said rear side of said front housing and defining therewith a card chamber for receiving said card and having a pair of light transmitting apertures aligned with said viewing tubes, said rear side of said front housing and the front side of said barrier plate having lands for guiding said card through said card chamber, a rear housing overlying said barrier plate and secured thereto and to said front housing and having a pair of light transmitting apertures aligned with said apertures in said barrier plate, and manually operable means carried by said rear housing for advancing said card stepwise through said chamber with each step bringing a pair of transparencies into register with said viewing tubes.

5. A stereoscopic viewer comprising, in combination, a front housing, a pair of horizontally disposed viewing tubes extending forwardly from said housing, a barrier plate overlying the rear side of said front housing and defining therewith a card chamber for receiving said card and having a pair of light transmitting apertures aligned with said viewing tubes, means in said card chamber for guiding said card therethrough and holding it in viewing position, said barrier plate having a vertically extending opening midway the sides of said card chamber, a rear housing overlying said barrier plate and secured thereto and to said front housing and having a pair of light transmitting apertures aligned with said apertures in said barrier plate and a vertical rectangular finger groove aligned with and extending below said vertical opening in said barrier plate, a finger slidable in and guided by said finger groove, a tooth carried by the upper end of said finger for engaging by its upper side a shoulder on said card to move the same through said card chamber, the underside of said tooth being beveled to cooperate with the lower edge of said vertical opening in said barrier plate to move said tooth rearwardly out of said vertical opening, said rear housing having a groove in its front surface extending semi-circularly from the bottom of said finger groove to intersect a plunger groove extending vertically along one side of said rear housing, a plunger slidable in said plunger groove, a plunger spring urging said plunger outwardly of its groove, and a resilient wire in and substantially filling said semi-circular groove and held therein by said barrier plate, said wire interconnecting said finger and said plunger and acting to bias the tooth of the former against said barrier plate and into said vertical opening therein to engage said shoulder on said card, downward movement of said plunger being accompanied by upward movement of said finger and subsequent forward movement of said tooth to engage a shoulder on said card and move the same upwardly, upward movement of said plunger by said plunger spring being accompanied by downward movement of said finger and subsequent withdrawal of said tooth from said shoulder and from said vertical opening in said barrier plate.

6. A stereoscopic viewer comprising, in combination, a front housing, a pair of horizontally disposed viewing tubes extending forwardly from said housing, a vertical guide along one edge of said front housing on the rear side thereof, a spring along the opposite edge on the rear side of said front housing for biasing one parallel edge of a stereoscopic transparency bearing card to hold the other parallel edge against said vertical guide, a barrier plate overlying said rear side of said front housing and defining therewith a card chamber for receiving said card and having a pair of light transmitting apertures aligned with said viewing tubes, said barrier plate having a vertically extending opening midway the sides of said card chamber, a rear housing overlying said barrier plate and secured thereto and to said front housing and having a pair of light transmitting apertures aligned with said apertures in said barrier plate and a vertical rectangular finger groove aligned with and extending below said vertical opening in said barrier plate, a finger slidable in and guided by said finger groove, a tooth carried by the upper end of said finger for engaging by its upper side a shoulder on said card to move the same through said card chamber, the underside of said tooth being beveled to cooperate with the lower edge of said vertical opening in said barrier plate to move said tooth rearwardly out of said vertical opening, said rear housing having a groove in its front surface extending semi-circularly from the bottom of said finger groove to intersect a plunger groove extending vertically along one side of said rear housing, a plunger slidable in said plunger groove, a plunger spring urging said plunger outwardly of its groove, and a resilient wire in and substantially filling said semi-circular groove and held therein by said barrier plate, said wire interconnecting said finger and said plunger and acting to bias the tooth of the former against said barrier plate and into said vertical opening therein to engage said shoulder on said card, downward movement of said plunger being accompanied by upward movement of said finger and subsequent forward movement of said tooth to engage a shoulder on said card and move the same upwardly, upward movement of said plunger by said plunger spring being accompanied by downward movement of said finger and subsequent withdrawal of said tooth from said shoulder and from said vertical opening in said barrier plate.

7. A stereoscopic viewer comprising, in combination, a front housing, a pair of horizontally disposed viewing tubes extending forwardly from said housing, a vertical guide along one edge of said front housing on the rear side thereof, a bow spring along the opposite edge on the rear side of said front housing for biasing one parallel edge of a stereoscopic transparency bearing card to hold the other parallel edge against said vertical guide, said bow spring reacting along a line through the pair of transparencies aligned with said viewing tubes, a barrier plate overlying said rear side of said front housing and defining therewith a card chamber for receiving said card and having a pair of light transmitting apertures aligned with said viewing tubes, said rear side of said front housing and the front side of said barrier plate having lands for guiding said card through said card chamber, said barrier plate having a vertically extending opening midway the sides of said card chamber, a rear housing overlying said barrier plate and secured thereto and to said front housing and having a pair of light transmitting apertures aligned with said apertures in said barrier plate and a vertical rectangular finger groove aligned with and extending below said vertical opening in said barrier plate, a finger slidable in and guided by said finger groove, a tooth carried by the upper end of said finger for engaging by its upper side a shoulder on said card to move the same through said card chamber, the underside of said tooth being beveled to cooperate with the lower edge of said vertical opening in said barrier plate to move said tooth rearwardly out of said vertical opening, said rear housing having a groove in its front surface extending semicircularly from the bottom of said finger groove to intersect a plunger groove extending vertically along one side of said rear housing, a plunger slidable in said plunger groove, a coil compression plunger spring urging said plunger outwardly of its groove, and a resilient wire in and substantially filling said semi-circular groove and held therein by said barrier plate, said wire interconnecting said finger and said plunger and acting to bias the tooth of the former against said barrier plate and into said vertical opening therein to engage said shoulder on said card, downward movement of said plunger being accompanied by upward movement of said finger and subsequent forward movement of said tooth to engage a shoulder on said card and move the same upwardly, upward movement of said plunger by said plunger spring being accompanied by downward movement of said finger and subsequent withdrawal of said tooth from said shoulder and from said vertical opening in said barrier plate.

References Cited in the file of this patent

UNITED STATES PATENTS

| Number | Name | Date |
| --- | --- | --- |
| 1,781,945 | Case | Nov. 18, 1930 |
| 1,796,432 | Barlatier | Mar. 17, 1931 |
| 2,003,480 | De Vry | June 4, 1935 |
| 2,276,735 | Miller | Mar. 17, 1944 |
| 2,590,260 | Mast et al. | Mar. 25, 1952 |

FOREIGN PATENTS

| Number | Country | Date |
| --- | --- | --- |
| 990,775 | France | June 13, 1951 |
| 992,062 | France | June 27, 1951 |